Feb. 16, 1937.                M. M. FROCHT                2,070,787
                       DISPLAY METHOD AND APPARATUS
                           Filed June 16, 1934
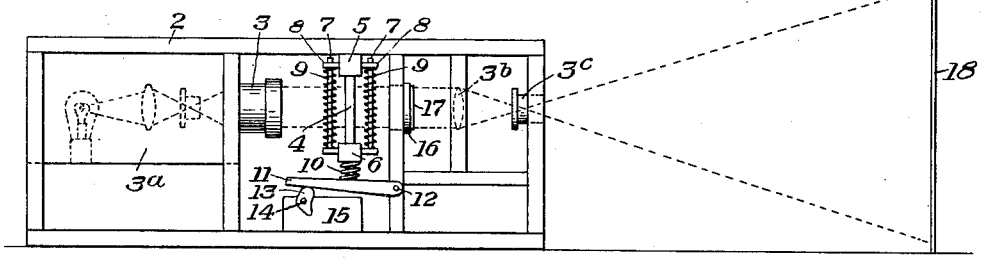
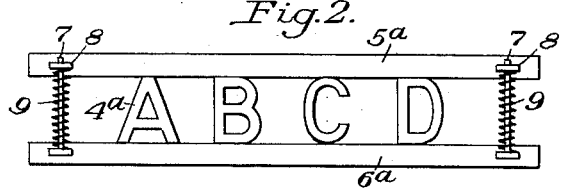  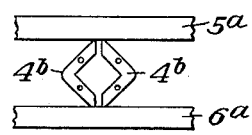
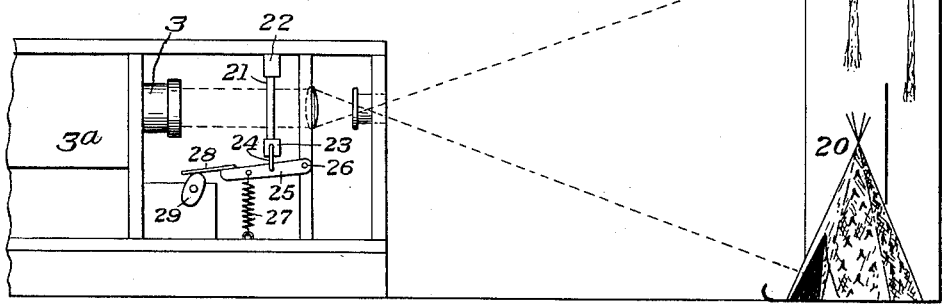
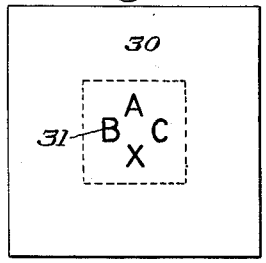  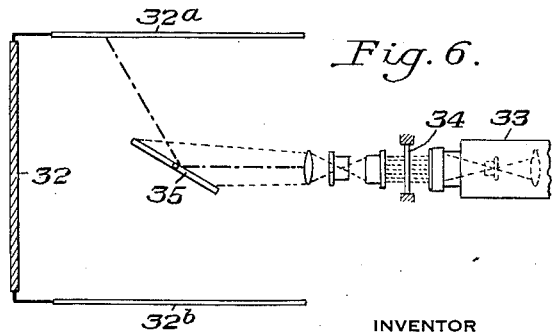
INVENTOR
Max M. Frocht
by his attorneys Patented Feb. 16, 1937

2,070,787

UNITED STATES PATENT OFFICE 2,070,787

DISPLAY METHOD AND APPARATUS

Max M. Frocht, Pittsburgh, Pa.

Application June 16, 1934, Serial No. 730,966

9 Claims. (Cl. 88—24)

This invention relates to a display method and apparatus through which a display may be effected and, more particularly, to a display method and apparatus of the character wherein changing light effects are used to enhance the attractiveness or direct attention to a primary object to be observed.

The invention is applicable to advertising displays wherein the primary object to be observed or to which attention is to be directed is in the nature of lettering or indicia, or is of a pictorial nature or some thing, as for instance, a display of the goods which are being advertised themselves. Under other circumstances, the display may be purely for entertainment as distinguished from advertising displays, and the primary object to be illuminated and to which attention is to be directed through the medium of the present invention are stage settings and persons, screens or the like.

According to the present invention, there is provided a method and apparatus for illuminating such primary objects to be displayed, whether the display is for advertising purposes or for purposes of entertainment. It is the purpose of the present invention to provide illumination of such primary objects wherein there is a constant changing and shifting of light effects in the display, and wherein there is preferably a constant changing and shifting of the patterns showing areas of different colors. The color range may be practically over the entire visible spectrum and the change from one color to another proceeds along beautiful and continuously merging lines. At the same time, there preferably are produced certain more or less distinct designs or patterns which are also constantly shifted and changed. In this way, very unusual and attractive illumination of the primary object is secured, such as to attract attention, as in the case of an advertising display or as to give a most unusual and pleasing appearance to stage settings, curtains, or other displays of a purely artistic and aesthetic character.

While I am, of course, aware that various ways of securing the colored illumination of primary objects for displays of this character have heretofore been widely used, the colors in such methods have been predetermined either by the use of a succession of screens or by the use of variously colored lights, and the pattern effects have been confined to such effects as could be obtained in a single screen or by the succession of a series of screens. The present invention is different from such methods of illumination as have heretofore been employed in that a single screen may produce both color and/or pattern effects, and this single screen produces variously changing patterns and changing colors.

According to the present invention, illumination of the primary object to be displayed is effected through the use of a photoelastic material placed in the field of a polariscope and changing the stresses in such material.

The light which has been passed through the photoelastic material is then projected against the primary object to be illuminated. The passage of the light through the transparent material produces beautiful color effect and patterns depending upon the particular shape of the screen, and the zones of color and the outline of the patterns shift, and the color intensity constantly changes with any variation of the stresses in the screen. These changes in the light-transmitting properties of the photoelastic material, under different conditions of stress, are known technically as "photoelastic properties", and it is the purpose of the present invention to make use of the phenomenon of photoelasticity in the illumination of primary objects to be viewed or displayed.

The invention may be readily understood by reference to the accompanying drawing which is of a more or less schematic nature, and in which Figure 1 is a schematic view of one embodiment of my invention;

Figure 2 is a modified form of photoelastic screen wherein the primary objects to be illuminated also comprise the photoelastic material;

Figure 3 is another view showing a modified form of screen;

Figure 4 is a view similar to Figure 1 showing the application of my invention to the illumination of a display such as a stage setting;

Figure 5 is a view of a modified form of screen; and

Figure 6 is a top plan view showing schematically another arrangement of a projector and screen wherein still further unusual color and pattern effects can be secured.

Referring first to Figure 1, 2 designates generally a supporting structure in which there is a polariscope 3. Polariscopes of various types are well known to those skilled in the art of optics. In addition to a source of light and the usual arrangement of lenses, the polariscope comprises separated polarizing elements. In the drawing, which is merely schematic, all of these parts have not been fully illustrated. Generally speaking, however, it may be assumed that the source of light, the first concentrating lens, and the first polarizing element are contained within a casing 3a. A second lens is indicated at 3b, and 3c designates the second polarizing element. These elements are usually polarizing prisms. The space between the two polarizing elements of the polariscope is generally termed the "field" of the polariscope. Supported in the frame 2 in the field of the polariscope is a photoelastic screen 4. This screen may be of any material having desirable photoelastic properties. Examples are transparent bakelite or celluloid. The material, however, does not necessarily have to be a solid, as certain colloids and jellies possess photoelastic characteristics.

In the drawing, I have shown the photoelastic screen 4 as being supported between a fixed upper supporting member 5 and a lower supporting bar 6. Slide rods 7 on the lower bar 6 pass through guides 8 on the upper bar 5, and compression springs 9 are disposed around these rods. The lower bar 6 is supported on a relatively stiff spring 10, the stiff spring 10 in turn having its lower end resting on the top of a lever 11 which is fulcrumed to the supporting frame at 12. The outer end of this lever rides on a cam 13 which may be of any desired regular or irregular shape. This cam is carried on a driving shaft 14 operated by a mechanism schematically indicated at 15. For the purpose of the present invention, this mechanism may comprise a casing within which is an electric motor and a reducing gear of any conventional or preferred design for turning the cam 13 at any desired rate of speed. The arrangement is such that when the shaft 14 is rotated, the cam 13 bearing against the lever 11 rocks this lever up and down. The compression spring 10 transmits the pressure from the lever 11 to the lower bar 6, resulting in the application of varying degrees of tension and pressure to the photoelastic screen 4. It will, of course, be appreciated that the guide rods 7 and the springs 9 are out of the path of the light in the field of the polariscope, the photoelastic screen 4 alone being in the polarized beam.

In the arrangement shown in Figure 1, I have shown a transparent screen 16 in the path of light in front of the photoelastic screen 4. The screen 16 may carry letters 17, or other advertising or display indicia. The letters or indicia 17 may be transparent or opaque. Assuming that they are opaque, a person standing in front of the apparatus would see the opaque lettering with the light from the projector passing through the screen 16 around the lettering. Instead of the apparatus being viewed directly, it is preferable to employ a screen 18, either in the form of a frosted glass or in the form of a reflecting screen such as a moving picture screen. In this case, the image of the primary object or lettering 17 would be viewed as projected against the screen 18 by the beam of polarized light which is passing through the photoelastic material 4 and then through the screen 16.

The result of passing the polarized light through the photoelastic screen 4 depends upon the shape and load-system on the photoelastic screen 4. As the forces on the photoelastic screen 4 change, shifting or concentrating the mechanical stresses in this screen, the projected pattern changes, the color zones shift and change, and the colors themselves change. For instance, regions of highly concentrated stresses may produce zones of intense blues and lavenders, whereas the less heavily stressed portions of the screen will produce zones wherein the reds, oranges and yellows are prevalent. Frequently there are secondary patterns and zones. As stated above, the patterns and the color zones shift and change, and the graduation of the colors from one shade to another shifts and changes in various portions of the illuminated field as the forces on the photoelastic screen 4 change.

The result is that one viewing the screen 18 sees the primary object 17 or its projected image illuminated in a field of constantly changing colors and color zones, the whole making a very attractive and beautiful display intended to arrest the eye of the passerby in an advertising display or to make a very pleasing and beautiful color effect in an artistic display where the primary objects 17 are not intended for advertising purposes.

For an advertising device, especially, the photoelastic screen itself may be the principal or primary object to be illuminated. This is illustrated in Figure 2 wherein the upper bar 5a corresponds to the upper bar 5 of Figure 1, and the lower bar 6a corresponds to the lower bar 6, other corresponding parts being correspondingly designated by the same reference numerals. In place of the photoelastic screen 4 being of any arbitrary shape, I have illustrated in Figure 2 an arrangement wherein the screen elements 4a are in the form of letters. Thus the projector serves to project the outline of these letters against the screen 18. By moving the bars 5a and 6a relatively to each other, varying degrees of strain or stress can be put on the letters 4a so that the projected image of the letters will show constantly changing patterns and color effects within the outlines of the letters themselves.

In Figure 3 I have shown the photoelastic stress screen elements as being of a particular shape which can be flexed with a minimum amount of pressure. In this figure, 5a designates the upper bar, as in Figure 2, and 6a designates the lower supporting bar. The photoelastic screens are designated 4b. They are shown as being in the form of angle members having two legs. A very light pressure on one of the bars 6a relative to the other will, with a shape of this kind, give a very considerable degree of flexing in the arms of the members 4b, thus giving a very wide change of pattern and color effect with the application of very little power. The shapes of the members 4b can be variously changed. They can be circular or square, or as shown in connection with Figure 2, of an outline corresponding to the outline of the primary object. However, it is preferable to use some shape where there are relatively long legs through which the stresses are transmitted, in order that a photoelastic effect and pattern change can be produced with a minimum amount of mechanical work. To improve the color effects, there are preferably circular or other shaped openings or grooves in the legs to give added attraction to the color effects produced, as these holes or notches form points of stress concentration.

Figure 4 is intended to illustrate primarily an arrangement wherein the polariscope 3 is intended to illuminate an artistic display as distinguished from an advertising display. In this figure, I have indicated more or less diagrammatically a stage setting 20 having various objects and scenery thereon constituting the primary objects to be displayed. Changing color and shadow effects of a very beautiful character can be secured by providing a photoelastic stress screen in the field of the polariscope, the screen 21 being similar to that shown in Figure 1 or 3, of any other suitable character or shape. Thus for a theater display, or for a miniature display having a scenic effect, the primary objects of the display are illuminated in a very unusual, unique and beautiful manner.

In Figure 4 I have shown the apparatus as being designed to exert a tension on the photoelastic stress screen 21 rather than a pressure as shown in Figure 1, but it will be understood that a combination of these forces may exist in either arrangement and that the illustrated methods of stressing the photoelastic stress screens are merely illustrative embodiments and arrangements which can be variously modified and changed to meet the requirements of a particular installation. In Figure 4 the photoelastic stress screen 21 is supported for tension between an upper bar 22 and a lower bar 23. The lower bar 23 is connected through a link 24 with a lever 25, this lever having a pivotal mounting at 26. A spring 27 pulls the lever 25 down to exert a considerable tension on the member 21. The lever 25 is provided with a leaf spring extension 28 for engagement with a cam 29. As the cam rotates the leaf spring 28 is intermittently urged upwardly to change the tension on the photoelastic screen 21 and thus change the illuminating and shadow effects on the primary display objects 20. The frequency and degree of change can be modified by changing the shape of the cam, the speed of rotation of the cam, and the strength of the springs, as well as by changing the character of the stress screens 21 themselves.

It will be noted that with the device shown in Figure 4, the second screen 16 of Figure 1 is omitted. This projector, without the screen 16, may be used in an advertising display. For instance, the projector of Figure 4 may be located back of a frosted glass screen as illustrated in Figure 5. The screen, designated 30 may have advertising indicia 31 thereon, the advertising indicia preferably being opaque. The projector of Fig. 4, being located behind the screen 30, will project the changing stress patterns against the area of the screen 30 on which the indicia appears. Thus the lettering or other indicia of a primary character will be exhibited against the background of the constantly changing stress patterns and colors.

Further unusual effects can be secured as illustrated in Figure 6 by mounting a movable reflector or refractor in front of the polariscope so as to catch the light emitted therefrom and direct it at different angles. In Figure 6, 32 designates an enclosure having frosted glass windows 32a and 32b at opposite sides thereof. 33 designates the polariscope, and 34 is the photoelectric screen located in the field of the polariscope. In front of the polariscope is a reflector 35. This may be a double-faced mirror mounted for rotation on an axis transverse to the direction of the light from the polariscope. As the mirror is rotated, it will catch the light emitted from the polariscope and reflect it at different angles against the frosted glass screens 32a and 32b. There is combined in this display the effect of the moving beam of light impinging against the viewing screens 32a and 32b at various angles, with the photoelastic color and pattern effects. The screen 34, of course, may be subjected to constantly varying stresses or forces as shown, for instance, in Figures 1 to 4.

The invention also lends itself to various further modifications and changes. For instance, instead of there being one photoelastic screen in the field of the polariscope, a progression of screens may be moved through the field. As illustrative of this, the screen shown in Figure 2 may be so proportioned that only one of the letters at a time would enter the field of the polariscope. By then moving the assembly of Figure 2 transversely, the succession of letters or color screens would be used.

Furthermore, color filters may be used in conjunction with the polariscope to modify the original colors produced by the photoelastic screen. For instance, if it is desired to enhance the orange and red colors, a filter may be used to reduce or decrease the blues, greens, and violets, and vice versa.

The invention may also be adapted in the form shown in Figure 1 or in Figure 5 to the making of motion picture film leaders and titles, or the backgrounds for songs which are projected onto moving picture screens, producing an effect of unusual character, especially when using color photography in the making of such leaders or characters. For instance, in Figure 5, the letters 31 may comprise the leader or title of a motion picture. It is photographed in the usual way of making titles, while the stress pattern which illuminates the letters is constantly changing and the colors are constantly changing. The resulting photograph shows a most remarkable and unusual display.

It will be understood that the various modifications which have been described are only typical of different ways in which the display may be used. It will be understood that the various constructions specifically described are for the purpose of illustration only and that the preferred embodiments of the invention may, from a mechanical standpoint, widely differ in construction and arrangement from an apparatus herein conventionally illustrated and described. In each of the described embodiments of the invention it will be seen that there is a primary display object such as the lettering 17 in Figure 1, or the lettering 4a of Figure 2, or the objects 20 of Figure 4, or the indicia 31 of Figure 5, all of which are displayed with and through the illumination by photoelastic stress effects. The term "primary object" as herein used and as used in the following claims is intended to designate the object of display, be it letters or be it other objects which are illuminated through the use of photoelastic stress effects.

The term "polariscope" as herein used is intended to comprise any arrangement wherein there are spaced light polarizing units. The term "field" of the polariscope as used herein is intended to cover the space between the two light polarizing units.

I claim:

1. In combination, a primary object to be displayed and means including a lens system for projecting an image of said primary object on a screen comprising a polariscope having a polarizing element and an analyzing element, a photoelastic stress screen in the field of the polariscope between said elements, a light source for passing a beam of light through said polariscope, and means for stressing said stress screen.

2. In combination, a primary object to be displayed and means including a lens system for projecting an image of said primary object on a screen comprising a polariscope having a polarizing element and an analyzing element, a photoelastic stress screen in the field of the polariscope between said elements, a light source for passing a beam of light through said polariscope, means for stressing said stress screen, and continuously operating means for changing the stresses in said stress screen.

3. In combination, a polariscope having a polarizing element and an analyzing element, a photoelastic stress screen having the shape of a primary display object, said photoelastic stress screen being disposed in the field of the polariscope between said elements, means including a light source and a lens system cooperating with said polariscope for projecting on a screen an image of said primary object in stress patterns, and means for stressing said object.

4. In combination, a polariscope having a polarizing element and an analyzing element, a photoelastic stress screen having the shape of a primary display object, said photoelastic stress screen being disposed in the field of the polariscope between said elements, means including a light source and a lens system cooperating with said polariscope for projecting on a screen an image of said primary object in stress patterns, means for stressing said object, and mechanically operated means for varying the stresses in said stress screen.

5. In combination, a viewing screen, a photoelastic stress screen having the shape of a primary object, and means for passing polarized light through said stress screen so as to project an image of said object in patterned colors on said viewing screen comprising a lens system, a source of illumination, a polarizing element between said source of illumination and said primary object, an analyzing element between said object and the viewing screen, and means for stressing said object.

6. In combination, a primary object to be displayed, and means for projecting patterned multicolored illumination upon said primary object comprising a source of illumination, a polariscope having a polarizing element and an analyzing element receiving light from said source, a photoelastic stress screen in the field of the polariscope between said elements, continuously operating means for changing the stresses in said stress screen, and a lens system cooperating with said polariscope.

7. In combination, a primary object to be displayed, and means for projecting patterned multicolored illumination upon said primary object comprising a source of illumination, a polariscope having a polarizing element and an analyzing element receiving light from said source, a photoelastic stress screen in the field of the polariscope between said elements, means for stressing said stress screen, and a lens system cooperating with said polariscope.

8. In combination, a primary object to be displayed, and means for projecting patterned multicolored illumination upon said primary object comprising a source of illumination, a polariscope having a polarizing element and an analyzing element receiving light from said source, a photoelastic stress screen in the field of the polariscope between said elements, means for stressing said stress screen, a lens system cooperating with said polariscope, a rotatable reflecting device for shifting laterally the illumination emitted from the polariscope, and means for turning said reflecting device.

9. In combination, a casing for supporting a light projecting system adjacent one end, a polariscopic system extending in the direction of the path of light from said system and having a polarizing element and an analyzing element, means for mounting within said casing said polariscopic system, a photoelastic stress screen in the field of the polariscope between said elements, a lens system for passing a beam of light in a direct path from said light projecting system through said polariscopic system and out through the other end of said casing, and continuously operating means for varying the stresses in said stress screen.

MAX M. FROCHT.